United States Patent [19]

Harkness et al.

[11] 4,048,787
[45] Sept. 20, 1977

[54] COMBINATION CLUTCH AND BRAKE FOR ROTARY POWER MOWER

[75] Inventors: Joseph R. Harkness, Germantown; Daniel E. Braun, Brookfield, both of Wis.

[73] Assignee: Briggs & Stratton Corporation, Wauwatosa, Wis.

[21] Appl. No.: 701,619

[22] Filed: July 1, 1976

[51] Int. Cl.² .................................................. A01D 69/10
[52] U.S. Cl. ....................................... 56/11.3; 56/11.6; 56/255; 192/11
[58] Field of Search .................... 56/10.5, 11.3, 11.6, 56/11.7, 11.8, 16.7, 16.9, 255; 192/17 R, 20, 18 R, 12 R, 11

[56] References Cited

U.S. PATENT DOCUMENTS

| 2,734,327 | 2/1956 | Whitney | 56/13.8 |
| 3,013,372 | 12/1961 | Basham | 56/11.8 |
| 3,367,459 | 2/1968 | Rubin | 192/11 |
| 3,543,892 | 12/1970 | DeBaillie | 192/11 |
| 3,570,637 | 3/1971 | Pitman et al. | 192/11 |

*Primary Examiner*—Russell R. Kinsey
*Attorney, Agent, or Firm*—Ira Milton Jones & Associates

[57] ABSTRACT

A combination clutch and brake for rotary power mowers of the type wherein the blade is fixed to a spindle driven by the engine through an endless belt type drive transmission. A medially pivoted lever has an idler roll at one end to engage and tension the belt and thereby activate the drive transmission when the lever is rocked in one direction and a claw at its other end which, upon movement of the lever in the opposite direction, engages the notched periphery of a brake disc encircling the blade spindle and frictionally engaged with a companion disc that is fixed with respect to the spindle. The lever is spring-biased in the direction to engage the brake disc and thereby stop blade rotation concomitantly with deactivation the drive transmission whenever a deadman control on the mower handle is released.

11 Claims, 6 Drawing Figures

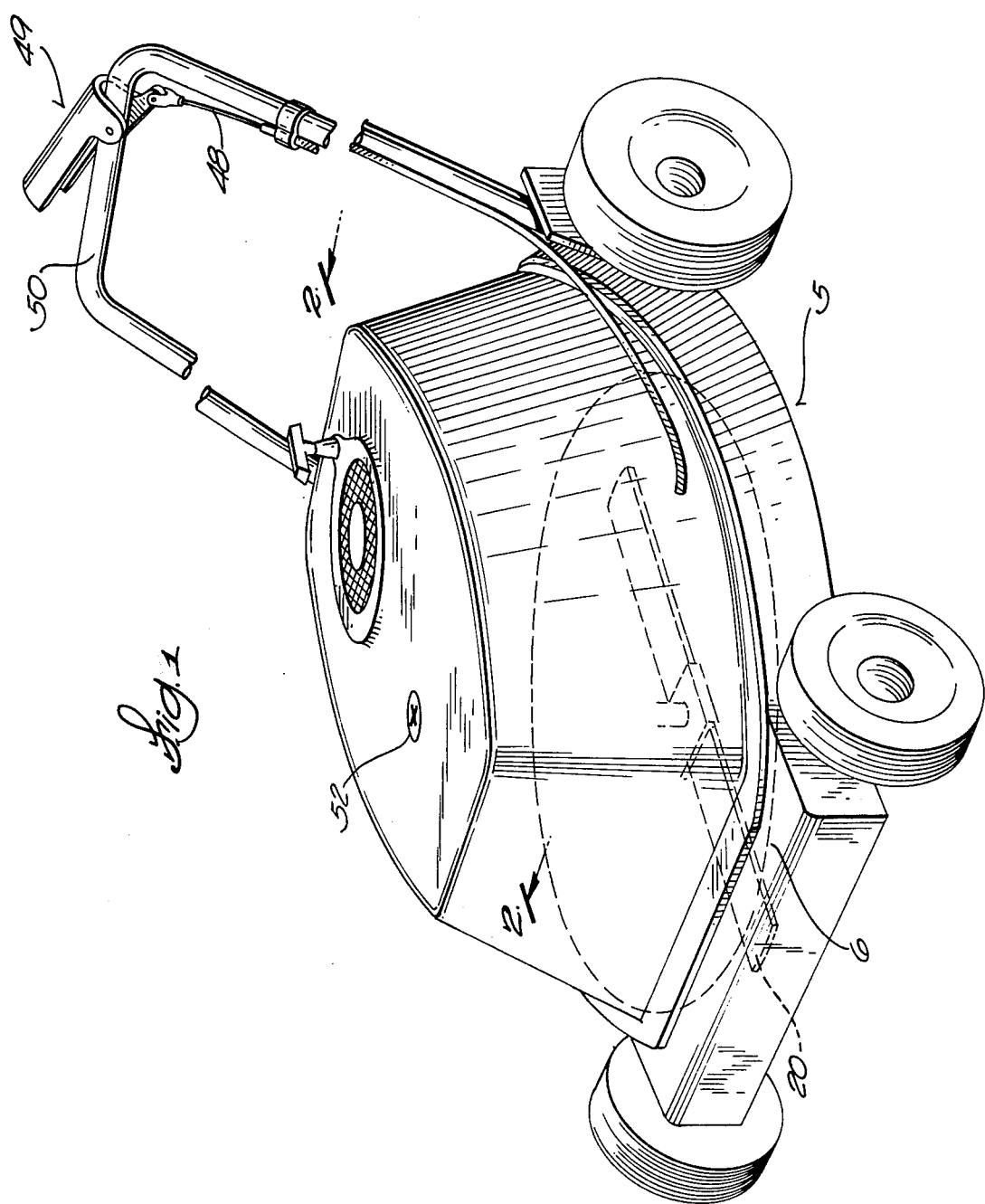

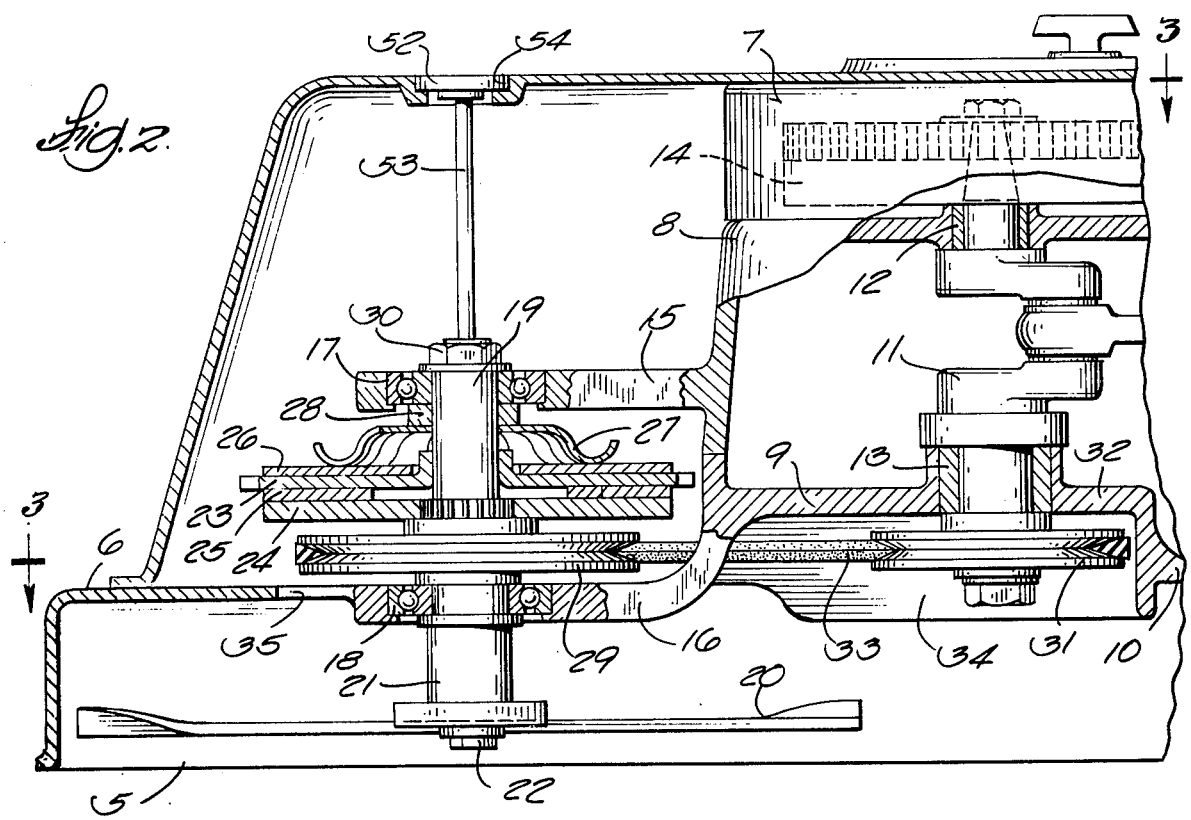
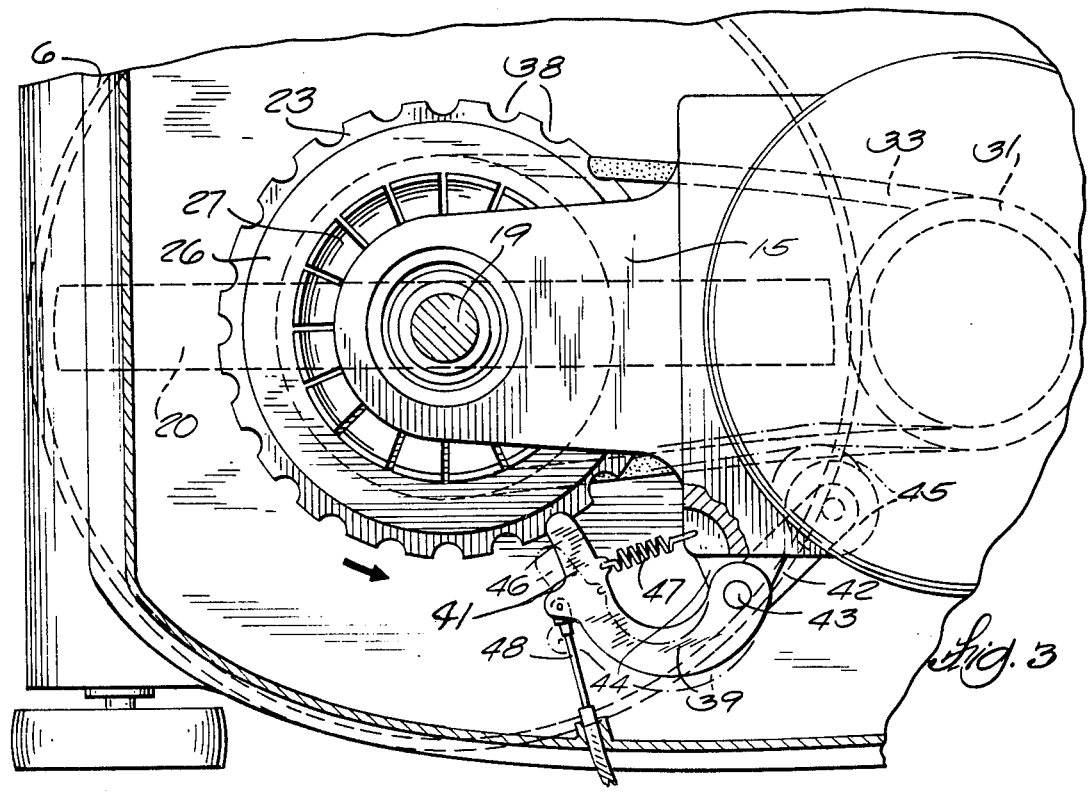

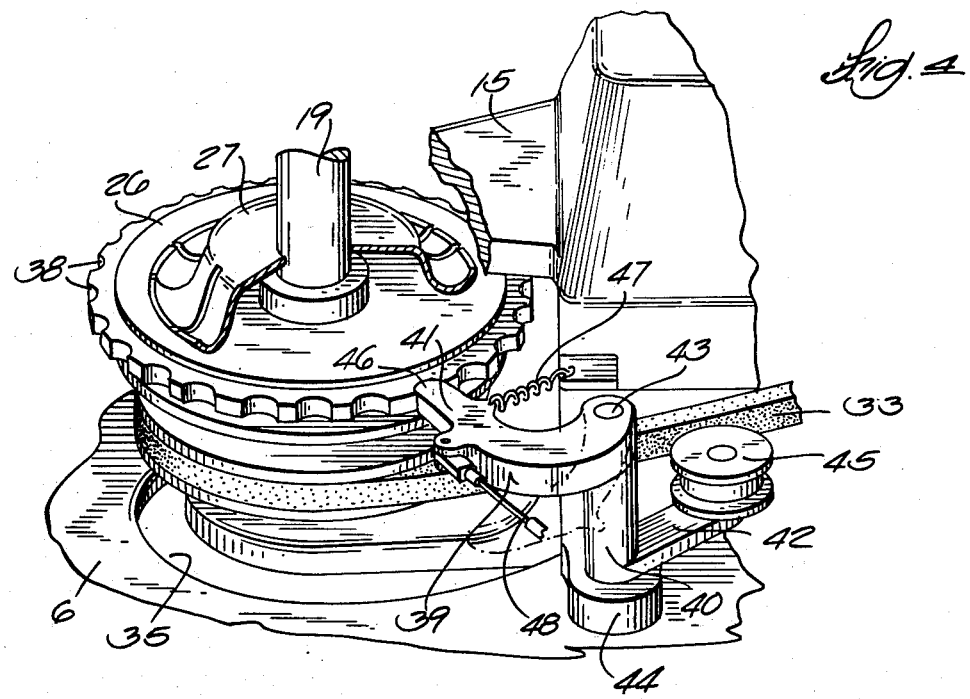
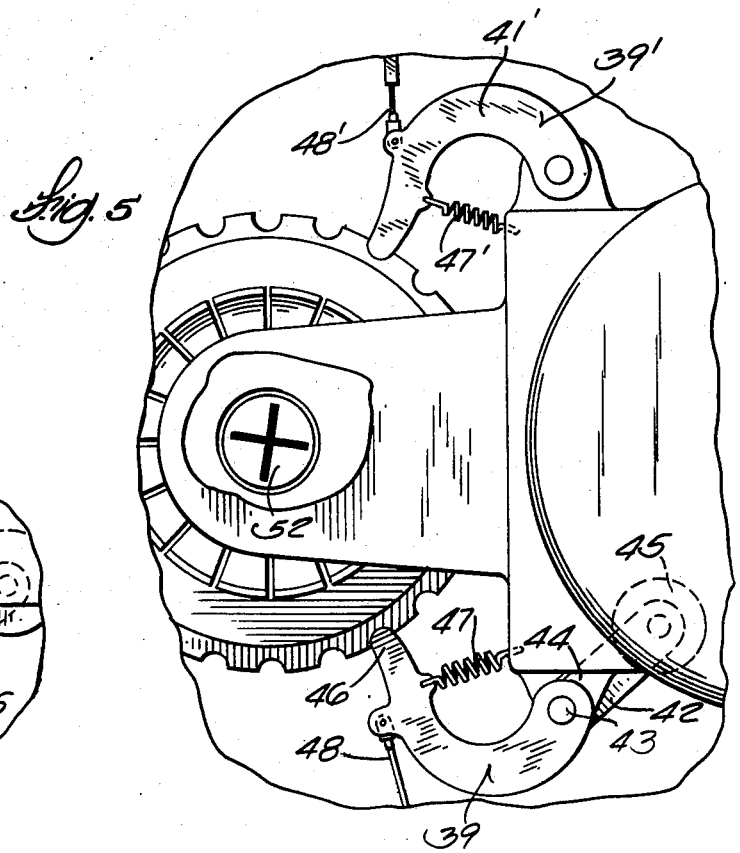

COMBINATION CLUTCH AND BRAKE FOR ROTARY POWER MOWER

This invention relates to power lawn mowers and, more particularly, to mowers of the rotary walk-behind type. For the most part, these mowers are powered by vertical shaft internal combustion engines. In some, the cutting blade is secured directly to the crankshaft of the engine and, in others, as in the present case, it is carried by a separately journalled spindle that is selectively drivingly connected with the engine.

The lawnmover industry is well aware of the need for equipping rotary mowers with reliable blade stopping capability and has been striving to attain the ultimate goal of making it possible to instantaneously stop a revolving blade. Many different avenues towards that objective have been explored with varying degrees of success. To date, the closest approach to its attainment is no doubt the invention forming the subject matter of the copending Harkness application, Ser. No. 667,696, which deals with rotary mowers in which the cutter blade is fixed to the engine crankshaft.

That Harkness invention provides a significantly improved brake that stops the engine abruptly in order to stop the blade. Briefly, it comprises superimposed discs that are heavily frictionably engaged. One of these discs is fixed to the engine crankshaft, and the other — which is not and, instead, is loose — has a ratchet wheel secured thereto. A pawl mounted to pivot about a fixed axis and arranged to be engaged with the toothed periphery of the ratchet wheel instantaneously stops rotation of the loose disc, which through its frictional engagement with the fixed disc, stops rotation of the engine crankshaft and of course the blade fixed thereto.

The present invention adapts the invention of the aforesaid Harkness application to rotary mowers of the type in which the cutter blade is not on the engine crankshaft, but — more important — it combines that brake in a novel way with a reliable clutch that is automatically activated to transmit torque from the engine to the cutter spindle as the brake is released and deactivated concomitantly with engagement of the brake.

While combined clutch and brake mechanisms on rotary mowers are by no means new — as evidenced by the Dowdle U.S. Pat. No. 2,985,992, the Meldahl U.S. Pat. No. 3,253,391, the De Baillie U.S. Pat. No. 3,543,892 and the Hoff U.S. Pat. No. 3,026,665, the prior art embodiments of that concept left much to be desired. Accordingly, it is the purpose and object of the present invention to provide a combination clutch and brake for rotary power lawn mowers of the type wherein the cutter blade is carried by a spindle separate from the engine, which has none of the objectionable characteristics of the prior art.

One of the disadvantages of prior combination clutch and brake mechanism for rotary power mowers of the type wherein the cutter blade is on a spindle separate from the engine, was the fact that part of the mechanism was mounted on the mower and the remainder thereof on the engine. This necessitated an assembly operation that sometimes introduced problems and divided responsibility for meeting prescribed dimensional tolerances, between the mower manufacturer and the engine maker. With a view to obviating these installation problems, this invention provides a combination clutch and brake that is entirely and completely a part of the engine.

In this connection, a particularly significant feature of the invention is that the bearings in which the cutter spindle is journalled are carried by the crankcase of the engine, the upper bearing being seated in an arm projecting from the main crankcase casting and the lower bearing being in an arm that projects from the combined engine base and crankcase cover.

Still another object of the invention is to provide a combination clutch and brake assembly for rotary power mowers that lends itself readily to a deadman type of control, wherein release of the control for any reason automatically declutches the blade from the engine and engages the brake to stop the blade.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of the embodiment of the invention constructed according to the best mode so far devised for the practical application of the principles thereof, and in which:

FIG. 1 is a perspective view of a rotary power lawn mower equipped with this invention;

FIG. 2 is essentially a vertical sectional view through FIG. 1 on the plane of the line 2—2;

FIG. 3 is a horizontal sectional view through FIG. 2 on the planes of the line 3—3;

FIG. 4 is a perspective view of the main parts of the combination clutch and brake assembly;

FIG. 5 is a top view of part of the structure shown in FIG. 2 to illustrate how the invention lends itself to the provision of an additional safety factor; and FIG. 6 is a fragmentary top view illustrating a modification of a part of the clutch and brake mechanism.

Referring to the drawings, the numeral 5 designates the wheeled chassis of a rotary power lawn mower of the walk-behind variety, equipped with this invention. Mounted on the deck 6 of the chassis is a vertical shaft internal combustion engine 7. The engine is of the customary single cylinder type in which the cylinder and crankcase body 8 constitute one casting and the crankcase cover 9 is another casting that includes a skirt or mounting flange 10 by which the engine is bolted to the deck of the lawn mower. The crankshaft 11 of the engine is journalled in coaxial bearings 12 and 13 in the crankcase and its cover, and at the upper end of the crankshaft is the customary flywheel and cooling fan 14.

Projecting from the wall of the crankcase opposite the cylinder is an arm 15 and, beneath it and formed integrally with the cover casting 9, is another arm 16. These arms support upper and lower coaxial bearings 17 and 18 in which a spindle 19 is journalled, the lower end of which has the cutting blade 20 of the mower fixed thereto by means of a hub 21 keyed to the spindle and removably held in place thereon by a nut 22.

Between its bearings 17 and 18 the spindle is encircled by a pair of brake discs 23 and 24, the former being loose on the spindle, i.e. freely rotable with respect thereto and the latter being fixed to the spindle. Between these discs and fixed to one of them, preferably the bottom fixed disc 24, is a friction washer 25, and overlying the upper loose disc 23 is an anti-friction washer 26. The brake discs are forced towards one another by a spring washer 27 that bears against the underside of a collar 28 on the spindle between the spring washer and the inner race of the upper bearing 17.

Below the fixed brake disc 24 the spindle has a pulley 29 keyed thereto with its hub confined between the disc 24 and the inner race of the lower bearing 18. The aforesaid parts are held assembled with the spindle by being confined between the nut 22 at the bottom of the spindle and a nut 30 at the top of the spindle.

Although not specifically illustrated, means are provided for securing the upper and lower bearings 17 and 18 in their respective supporting arms. Hence the spindle assembly is securely supported by the engine with its axis parallel to that of the crankshaft and its pulley 29 horizontally aligned with a driving pulley 31 that is fixed to the bottom end portion of the crankshaft beneath the bottom wall 32 of the cover casting.

An endless belt 33 trained about the pulleys 29 and 31 drivingly connects the spindle with the engine, but only when the belt is suitably tensioned. The arm 16 lies between the stretches of the belt so that the belt can be applied and removed, and the cover casting 9 has a downwardly projecting flange 34 that is wrapped partway around the driving pulley 31 and projects tangentially towards the bearing 18 to provide a guard for the belt.

Obviously, of course, the deck of the mower must have an appropriately sized and shaped hole 35 to accommodate the structure on the cover casting below the level of its mounting flange 10.

By controlling the belt tension, the blade spindle is either drivingly connected with the engine crankshaft or not. The belt and the means for tensioning the same thus constitutes the clutch of the combined clutch and brake. The brake is similar to that of the aforesaid Harkness application, with one notable difference — there is no pawl and ratchet. Instead, the loose brake disc 23 has equispaced notches 38 in its periphery and the pawl is replaced by a medially pivoted lever 39 having a hub 40 from which arms 41 and 42 extend. These arms are vertically offset from one another, as best seen in FIG. 4, and the hub is journalled on a fixed pivot pin 43 that is solidly mounted in a lateral extension 44 of the crankcase cover.

The pivotal mounting of the lever and the vertical offset between its arms are so dimensionally related that the arm 41 is coplanar with the loose brake disc 23, and the arm 42 is at a level such that an idler pulley 45 freely rotatably mounted on its outer end is engageable with the adjacent stretch of the belt 33. Counterclockwise direction of the lever 39, as viewed in FIGS. 3 and 4, thus tightens or tensions the belt to activate the clutch; and rotation of the lever in the opposite direction not only loosens the belt to declutch the blade spindle from the engine, but also engages a claw 46 at the outer extremity of the lever 41 with the notched periphery of the disc 23. As can be readily appreciated, entry of the claw into one of the notches 38 abruptly stops rotation of the disc.

A tension spring 47 yieldingly urges the lever 39 in the brake engaging direction and a pull on the endwise shiftable wire 48 of a Bowden wire cable 49 that leads from the lever to a deadman type controller 50 on the handle 51 of the mower, rocks the lever in the direction to disengage the brake and simultaneously activate the clutch by tightening the belt 33. Accordingly, for driving torque to be applied to the blade spindle, it is necessary to hold the controller 50 in its operative position. Release of the controller or any malfunctioning or breakage of its connection with the lever 39 will immediately result in the spring 47 setting the brake and deactivating the clutch.

The only way in which intentional or unintentional release of the deadman controller would fail to stop the cutting blade and disconnect it from the engine would be breakage of the spring 47, an event that is most unlikely and — while that occurrence might manifest itself at the deadman controller — it cn also be visually depicted by an indicator dial 52 on the upper end of an extension 53 of the blade spindle, accommodated by a hole in a hood 54 removably mounted on the mower deck over the engine and its driving connection with the spindle.

Attention is directed to the U-shaped formation of the brake engaging arm 41 of the lever 39. By virtue of this shape, the arm 41 has a degree of resilience that allows its outer extremity to move towards the pivot axis of the lever upon engagement of the claw 46 in one of the notches 38. The shock of abruptly stopping rotation of the loose brake disc 23 is thus cushioned without interfering with the suddenness of the brake application.

If desired for redundant safety, a secondary brake engaging lever 39' can be provided to engage the notched loose brake disc at a point circumferentially spaced from the engagement therewith of the primary lever 39. FIG. 5 illustrates this added feature. As there shown, the lever 39' has only one arm — namely, the bake-engaging arm 41', but — like the lever 39 — this secondary lever is spring biased in the direction to engage its claw 46' with the periphery of the disc 23, and is pulled in the opposite direction by a control cable 48'.

While it is preferable to provide the brake engaging arm 41 with inherent resilient yieldability to cushion the shock of brake engagement, this objective can also be attained or augmented by dividing the arm 41 into hingedly connected inner and outer sections 55 and 56 and equipping the pivoted connection between these sections with a heavy torsion spring 57 that yieldingly resists movement of the extremity of the outer section towards the hub 40.

It should be noted that by making the driving pulley on the engine crankshaft smaller than the driven pulley on the blade spindle, a speed reduction is obtained that enables the engine to be run at a more reasonable speed, thus keeping down its size and cost, without incurring objectionably high blade tip speeds.

Those skilled in the art will appreciate that the invention can be embodied in forms other than as herein disclosed for purposes of illustration.

The invention is defined by the following claims.

We claim:

1. In a rotary power lawn mower having a chassis with a substantially horizontal deck, a prime mover on the deck, and a rotary blade fixed to a spindle that is drivingly connected with the drive shaft of the prime mover, the improvement whereby rotation of the blade can be abruptly stopped concomitantly with disconnection thereof from the drive shaft of the prime mover, said improvement comprising the combination of:

A. bearing means fixed with respect to the deck of the chassis and the prime mover, with the axis thereof vertical and spaced laterally from the drive shaft;

B. a spindle journaled in said bearing means with the lower portion thereof beneath the deck and having the blade fixed thereto;
C. a disengageable clutch through which the spindle is drivingly connectable with the drive shaft
D. a brake for stopping rotation of the spindle, comprising
   1. frictionally engaged complementary fixed and free brake elements encircling the spindle, the fixed brake element having a torque transmitting connection with the spindle and the free brake element having no torque transmitting connection with the spindle except through its frictional engagement with the fixed brake element, and
   2. brake applying means operable to abruptly stop rotation of the free brake element;
D. means interconnecting said brake applying means and said disengageable clutch, whereby application of the brake is concomitantly accompanied by disengagement of the clutch and vice versa; and
E. control means operatively connected with said interconnecting means and through which concomitant functioning of said brake and clutch may be manually controlled.

2. In a rotary power mower, the improvement defined by claim 1, wherein the means forming said disengageable clutch comprises an endless belt trained around pulleys on the drive shaft and the spindle, and
wherein said interconnecting means comprises a pivoted member constrained to rotate about an axis fixed with respect to and parallel with the axes of the drive shaft and of the spindle, to rotate in one direction as said brake is applied and in the opposite direction when it is released, and an idler pulley on said pivoted member operable by rotation of said member in said opposite direction to tension said belt and thereby activate the clutch.

3. The rotary power mower of claim 2, further characterized by
biasing means acting on said pivoted member and operable when unrestrained to rotate the same in said opposite direction.

4. The rotary power mower of claim 3, wherein said free brake element is a circular disc,
wherein said pivoted member has end portions projecting in opposite directions from its pivot axis,
wherein said idler pulley is on one of said end portions, and
wherein said brake applying means comprises circumferentially spaced abutment means on the periphery of said circular disc, with one of which the extremity of the other end portion of said pivoted member engages when it is rotated by the biasing means.

5. The rotary power mower of claim 4, wherein said other end portion of the pivoted member has a degree of resilient yieldability to cushion the shock of abruptly stopping rotation of said free brake element by enabling the extremity of said other end portion of the pivoted member to have a degree of yieldingly resisted movement towards the axis about which the pivoted member rotates.

6. The rotary power mower of claim 1, wherein the prime mover is a vertical shaft internal combustion engine having a crankcase,
and wherein said bearing means in which the blade spindle is journaled is fixed with respect to the engine crankcase.

7. The rotary power mower of claim 6, wherein the crankcase of the engine comprises a main body portion and a cover portion,
and wherein said bearing means comprises an upper bearing carried by the main body portion of the engine crankcase and a lower bearing carried by the crankcase cover portion, said upper and lower bearings being coaxial.

8. A rotary power lawn mower having a chassis with a substantially horizontal deck, an internal combustion engine mounted on the deck with its drive shaft projecting downwardly through a hole in the deck, bearing means fixed with respect to and spaced laterally from the engine drive shaft with the axis thereof vertical, a spindle journaled in the bearing means with a portion thereof below the deck, a blade secured to the spindle below the deck, and drive transmission means below the deck to drivingly connect the spindle with the engine drive shaft, said mower being characterized by:
said bearing means in which the spindle is journaled being mounted on the internal combustion engine.

9. The rotary power mower of claim 8, further characterized by:
the engine having a crankcase with a main body portion and a cover portion joined to one another on a substantially horizontal plane, with the cover portion below the body portion,
and wherein said bearing means comprises an upper bearing carried by the body portion of the engine crankcase and a lower bearing carried by the cover portion of the engine crankcase, said bearings being coaxial.

10. The rotary power mower of claim 9, wherein said drive transmission means comprises:
an endless belt trained around pulleys on the spindle and on the engine drive shaft, and belt tensioning means comprising an arm mounted on a pivot projecting down from the crankcase cover portion for rocking motion about a vertical axis, and an idler pulley on said arm to engage a stretch of the belt upon rocking motion of the arm in one direction.

11. A vertical shaft internal combustion engine having
1. a crankcase with a body portion and a cover portion joined to one another on a substantially horizontal plane with the cover portion below the body portion, and
2. a drive shaft projecting down from the bottom of the cover portion to project below the deck of a rotary lawn mower upon which the engine is mounted,
said engine being characterized by:
A. superimposed upper and lower arms projecting laterally from its crankcase body portion and its cover portion;
B. coaxial bearings in said superimposed arms, the axis of which is parallel to that of the engine drive shaft;
C. a spindle journaled in said coaxial bearings and having means at its lower end for attaching a mower blade thereto;
D. a controllable driving connection between the engine drive shaft and the spindle;
E. brake means on the spindle, which when engaged prevents rotation of the spindle; and
F. means for concomitantly disengaging the brake means and activating the driving connection and vice versa.

* * * * *